April 25, 1950

R. C. DU PONT 2,505,707

SHOCK ABSORBING METHOD AND APPARATUS FOR
AIR PICKUP SYSTEMS AND THE LIKE

Filed Dec. 21, 1944

Witness:
Ann H. Backus

Inventor
Richard C. duPont, dec'd
Wilmington Trust Co., exec.
by Hyde W. Ballard
Attorney.

April 25, 1950 R. C. DU PONT 2,505,707
SHOCK ABSORBING METHOD AND APPARATUS FOR
AIR PICKUP SYSTEMS AND THE LIKE
Filed Dec. 21, 1944 6 Sheets-Sheet 4

Witness:
Ann Backus.

Inventor
Richard C. duPont, dec'd
Wilmington Trust Co., exec.
by Hyde W. Ballard
Attorney.

April 25, 1950 R. C. DU PONT 2,505,707
SHOCK ABSORBING METHOD AND APPARATUS FOR
AIR PICKUP SYSTEMS AND THE LIKE
Filed Dec. 21, 1944 6 Sheets-Sheet 5

Witness:
Ann H. Backus

Inventor
Richard C. duPont, dec'd
Wilmington Trust Co., exec.
by Hyde W. Ballard
Attorney.

Patented Apr. 25, 1950

2,505,707

UNITED STATES PATENT OFFICE 2,505,707

SHOCK ABSORBING METHOD AND APPARATUS FOR AIR PICKUP SYSTEMS AND THE LIKE

Richard C. du Pont, deceased, late of Granogue, Del., by Wilmington Trust Company, executor, Wilmington, Del., assignor to All American Airways, Inc., a corporation of Delaware Application December 21, 1944, Serial No. 569,180

21 Claims. (Cl. 258—1.2)

This invention relates to air pick-up systems and more particularly to emergency pick-up operations involving personnel and aircraft.

Heretofore, the apparatus necessary for making a non-stop pick-up by means of an aircraft in flight in all cases required the use of particularly adapted equipment permanently installed in the aircraft. Typical of such equipment are a depending arm and hook, and energy absorbing winch mounted in the plane. Typical disclosures of such equipment are found in Patent No. 2,319,881 to du Pont et al. and application Serial No. 333,081, filed May 3, 1940, in the name of Stuart C. Plummer, Patent Number 2,373,413. In these systems, the method of absorbing the shock incident to accelerating the load to be picked up, involves the use of rubber and air-oil shock struts of various types. Greatly improved results and elimination of hazards were achieved with the use of synthetic plastic lines and loops such as disclosed in the applications of Stuart C. Plummer, Serial No. 423,999, filed December 22, 1941, Patent Number 2,373,414, Richard C. du Pont Patent Number 2,418,702, Serial No. 478,517, filed March 9, 1943, and Richard C. du Pont Patent Number 2,407,634, Serial No. 481,824, filed April 5, 1943. In all of these later developments, however, it was still necessary to employ a braking device which would more or less gradually retard the pay out of the line in order to accelerate the load.

The present invention contemplates a line which per se will absorb the entire shock of accelerating the required object whether it be a human being, a mail container, a glider, or another aircraft. Although the line is not completely destroyed as a line after making one pick-up, its initial energy dissipating characteristics are never fully recovered, and therefore, it is contemplated that this invention is particularly adapted to operations of an emergency nature in which the line as shock absorbing equipment becomes an expendable item.

Therefore, a primary object of this invention is the provision of a shock absorbing or energy dissipating element adapted to absorb the energy incident to transferring kinetic energy into potential energy and vice versa which is associated with a change in the velocity of an object.

The invention also has for secondary objects the methods of constructing such a shock absorbing element as well as methods of utilizing it.

Fig. 1 is a view of a man pick-up showing the installation of pick-up equipment and the use of a pick-up hook position by an arm;

Fig. 2 illustrates the same type of pick-up showing how the apparatus is adapted to be used in a standard bomber without structural modification;

Like reference characters denote like parts in the several figures of the drawings.

While certain novel features of the invention are disclosed herein with considerable detail with respect to certain particular forms of the invention, it is not desired to be limited to such details since many changes and modifications may well be made without departure from the spirit of the invention in its broadest aspect.

Referring more specifically to the drawings, aircraft 20 may be any type of plane suitable for the particular pick-up operation contemplated. For the purposes of man pick-up, it is desirable that the plane used have a hatch or bomb bay 21 through which the man may enter the plane.

In Fig. 1, the plane is equipped with a pick-up arm 22 pivotally attached to the aircraft at 23, and a detachable pick-up hook 24. A length of line 25, the special characteristics of which will be more fully described hereinafter, is attached to the hook 24 at one end and to any suitable structure 26 on the plane at the other end. The ground equipment comprises a pair of station poles 27 which support the loop 28 having a substantially horizontal upper ply 29. The poles are supported by sockets 30 acting in combination with the tension in the upper ply 29. Releasing clips 31 secure the upper ply to the poles and additional clips 32 hold marker flags 33 in the plane of the upper ply. The loop 28 is attached to a leader 34 which is in turn secured to a pick-up harness (not shown) worn by the person 35 to be picked up.

Fig. 2 shows the same ground equipment as seen in Fig. 1 but a grapple 36 trailing from aircraft 20' is used instead of the arm 22 and positively positioned hook 24. It will be obvious that it is only necessary to use a single pronged hook where it can be accurately positioned by means of an arm. A multiple pronged grapple must be used, however, where there is no other positioning device. Grapple 36 is likewise connected to any suitable part of the plane by means of line 25'.

As the plane flies over the station, the hook 24 or the grapple 36, as the case may be, will become engaged with upper ply 29 of the ground loop, this in turn pulls the loop from releasable clips 31 and 32 and causes the person on the ground to be gradually accelerated in the general manner shown in Figs. 10 to 13. After acceleration has been completed, the person may then be hauled into the plane either manually or by means of a standard bomb hoist (not shown) customarily installed in planes of this type, the hatch or bomb bay closed, and arm, if any, retracted.

The details of the hook, arm, ground station, and sockets form no part of the present invention. To complete the disclosure with respect to these structures, reference may be had to application Serial No. 411,961, filed September 23, 1941 in the name of Stuart C. Plummer, Patent Number 2,367,607, and application Serial No. 483,843, filed April 21, 1943, in the name of Stuart C. Plummer, Patent Number 2,402,574.

Figure 3:
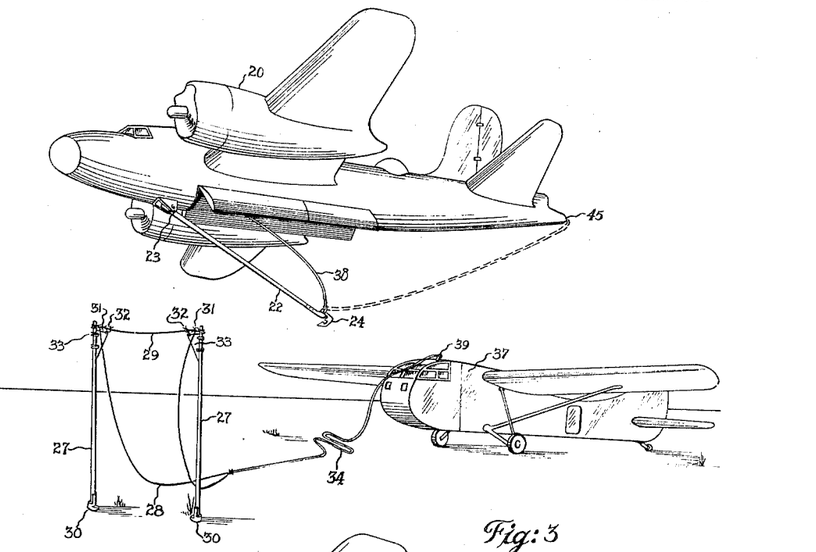
Fig. 3 illustrates the pick-up of a glider.
Figure 7:
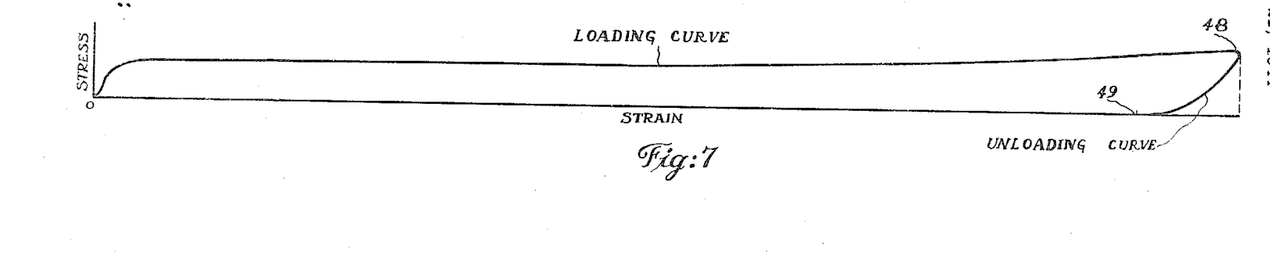
Fig. 7 is a graph showing the stress-strain diagram of a sample of unoriented synthetic plastic rope.

Fig. 3 illustrates the pick-up of a glider 37 by means of aircraft 20. The installation in the plane and the ground equipment will be the same as that shown in Fig. 1 with the exception that line 38 should be desirably of a larger diameter and greater length in order to dissipate the energy incident to accelerating the larger weight of the glider. In this case, leader 34 is connected to the glider 37 by means of the standard glider release 39 which is well known in the art. After the glider has become air borne and fully accelerated, the glider may be towed to its destination and released in flight by manipulating release 39. In performing this operation the line has a dual function; first, to absorb the energy incident to accelerating the glider to the speed of the tug or towing plane; and second, to thereafter act as a tow line of high strength and having sufficient residual energy absorption to effect smooth towing in rough air. Fig. 7 shows that approximately 95 per cent of the energy imparted is absorbed in the initial application of force. This leaves about 5 per cent or less of residual energy which is unabsorbed, resulting in an amazing efficiency.

After the initial stretching takes place, the line in a towing operation performs in the manner disclosed in the application Serial No. 481,824, filed April 5, 1943, in the name of Richard C. du Pont, Patent Number 2,407,634, cited above.

In the initial absorbing operation there is little or no elasticity, but on further elongation such as occurs in subsequent towing through rough air, the line acquires a distinct elastic quality and will return substantially to the length reached after the initial stretching, but the energy absorbed in the subsequent elastic elongations is far less than that initially absorbed. The above statement assumes, of course, that the diameter, length, and loading conditions of the original stretching were such as to elongate the line approximately to the point at which maximum elasticity occurs. It is to be noted that this point will be below the breaking strength of the line and that it will depend to some extent upon the rate of loading.

Figure 4:
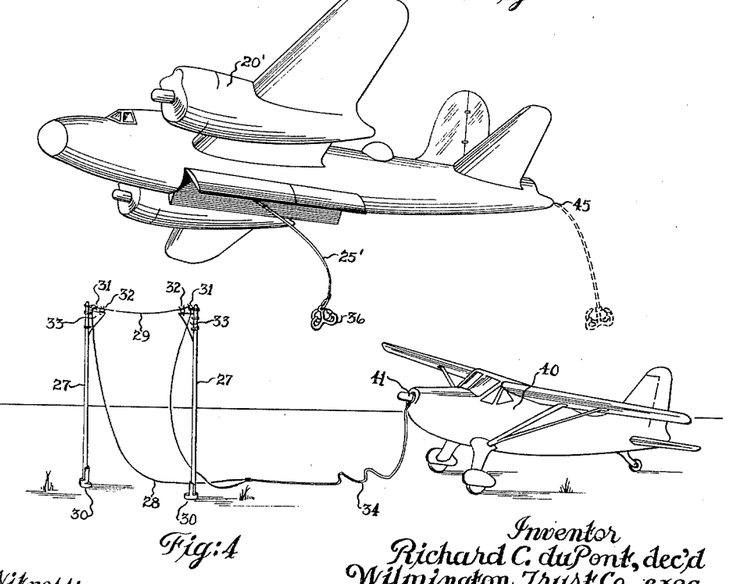
Fig. 4 illustrates an emergency pick-up operation of a disabled aircraft using no special installation on the pick-up or tug plane.

Fig. 4 illustrates the emergency retrieving of a powered aircraft 40 which is unable to maintain independent flight due to engine failure, lack of fuel, or any other cause which would not interfere with its being towed through the air. The ground equipment of Fig. 4 is likewise similar to that of Figs. 1 to 3 with the exception that leader 34 is secured to the disabled aircraft at a suitable towing point 41 which for a single engine craft, as illustrated, may be the engine crankshaft either with or without the removal of the propeller. As in the case of a glider, the disabled craft may be towed to a desired location and released either from the tug or from the towed craft. If the disabled aircraft is not already equipped with a suitable release 39, the line may be disconnected at or near the towed craft by means of a slipknot which is tight when tension is applied to the towing line but which may be untied by the pilot of the towed craft when tension is relieved or a disconnecting element (not shown) of any well known type may be placed in the tow line near its point of attachment to the towed craft and in such a way that it may be operated by means of a separate cord or string by the pilot of the towed craft.

To emphasize the peculiar adaptation of this invention to emergency operations, either military or civilian, let it be assumed that a message is received at an air base giving the location and type of a disabled aircraft which may even be behind enemy lines, or giving the location of personnel who must be rescued either from behind the enemy lines or in case of accident. Heretofore to effect such an operation, it has been necessary to employ a pick-up and towing aircraft which has had expensive and special shock absorbing equipment previously installed. With the use of the present invention, it is only necessary to take any plane having the requisite power for the desired operation, place in this plane the proper ground equipment, and a length of special shock absorbing line and a grapple. The rescue plane then flies to the designated location, drops by parachute the ground equipment and proper instructions for the erection of the ground station and the attachment of the loop and leader to the poles and to the person or to the aircraft. The instructions include the proper location of the personnel or plane with respect to the station and the technique to be employed in the subsequent towing operation. Upon receiving the signal from the ground that the station has been erected and all is in readiness, the pick-up is effected in the manner described above, thus retrieving valuable equipment and personnel, as the case may be. The station poles, sockets, and flags are inexpensive and would be considered expendable items in most cases. It will be understood, therefore, that it is not necessary to employ a rescue plane having any specially installed equipment whatsoever and that the entire rescue operation can be effected in a matter of minutes.

Figure 5:
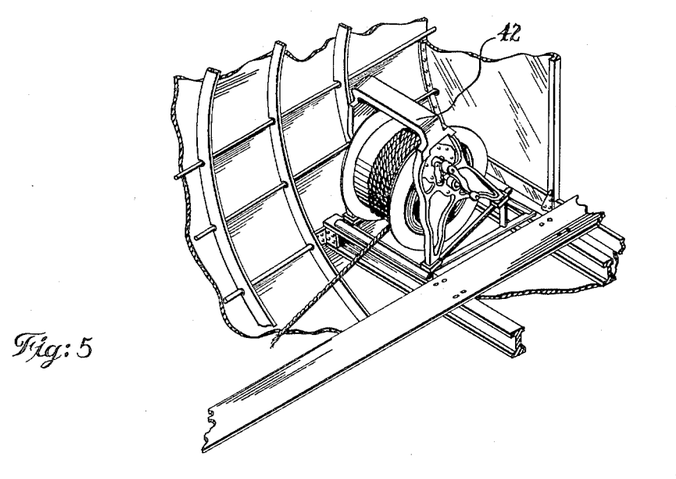
Fig. 5 is a fragmentary detail of the interior of a pick-up plane showing the automatic braking winch heretofore used.
Figure 6:
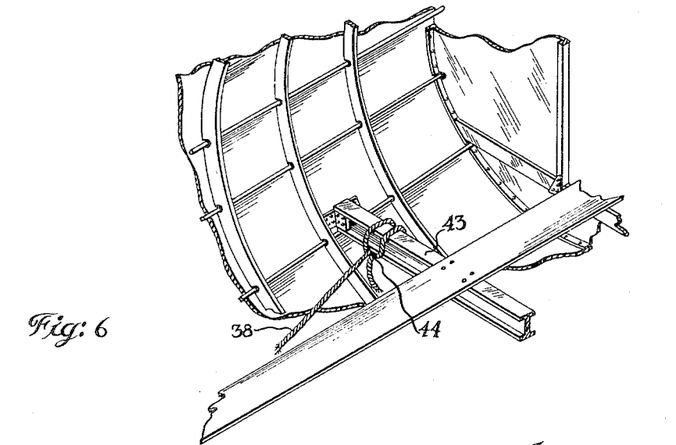
Fig. 6 illustrates the simplification of installation attainable through the use of this invention over the installation of Fig. 5.

In order to more fully illustrate the installation inside the aircraft and to appreciate the advantages to be derived from the ability to use any available aircraft instead of one having special pick-up equipment, reference should be made to Figs. 5 and 6. Winch 42 is an energy dissipating shock absorber designed especially for accelerating an object to be picked up by an aircraft. Details of the construction of such a winch form no part of this invention but may be more fully appreciated by reference to application Serial No. 472,600, filed January 16, 1943, in the name of Arthur B. Schultz, now Patent Number 2,433,488. Winch 42 may be considered to be representative of any shock absorbing device in the aircraft whether it be of a mechanical, hydraulic, or other type. Such a device as winch 42 would be necessary to effect a pick-up operation with the use of a line constructed of material having any characteristics heretofore known. It would be immaterial whether winch 42 were located in the towing aircraft or in the glider 37, or disabled aircraft 40.

In practising this invention, it is only necessary to tie securely the shock absorber which is line 25′, 25 or 38 to a suitable cross member 43 by means of any non-slipping knot 44. In the case of aircraft rescue work in which there would be no occasion to shorten the length of the line after the pick-up has been effected, it would only be necessary to secure the shock absorber 38′ to the standard glider towing fitting located at 45 in all military craft adapted for glider operations. Under these conditions, the line would be attached to the standard glider tow plug 45 before takeoff and immediately prior to the pick-up operation, the hook with shock absorber attached, would be lowered in the position shown in Fig. 3 and with the shock absorber located somewhat as shown in dotted lines in this figure. A corresponding application appears in dotted lines in Fig. 4 in the case of an aircraft having no pick-up arm.

The method employed in effecting a pick-up using the tow plug 45 and arm positioned hook of Fig. 3 comprises attaching one end of the tow line in the release fitting at the tail of the aircraft before take off. The other end of the line to which the hook it attached will then be withdrawn inside the fuselage through the open hatch or door. The doors are then closed and the arm raised in locked position. When the location of the pick-up has been reached, the arm will be lowered, the doors opened, and then the arm is raised sufficiently to permit the operator to attach the hook in its position at the end of the arm. The arm is then again lowered and all is in readiness for the pick-up. When using the tow plug without the arm, as shown in Fig. 4, the preliminary procedure will be the same, but in preparing for the pick-up, the doors will simply be opened and the grapple allowed to drop out and trail from tow plug 45.

After the glider or aircraft has detached itself from the other end of the line, the pilot of the tug may release the line, grapple, loop and leader by operating the release before landing.

Improved trailing stability of the cable and grapple may be obtained by securing wind sock or air drag 46 to the end of the line or to the cable itself (Fig. 2). It will be obvious that such an air drag can also be applied to the form of Fig. 4.

The kinetic energy required to pick-up an object weighing 200 pounds (roughly equivalent of a man and harness) by means of an aircraft traveling at 130 miles per hour is on the order of 105,000 foot pounds. A 7,000 pound glider picked up at the same speed has a kinetic energy of approximately 4,000,000 foot pounds. This energy in previous air pick-up systems which have not utilized a catapult has been dissipated by some device which controlled the paying out of a line or cable either from the pick-up aircraft or from the object which was being accelerated and at the same time decelerated the rate of pay out of this line. The energy required to accelerate the object was dissipated principally in the form of heat in the brakes or braking structure used.

It has been found that a shock absorber capable of dissipating sufficient energy to accelerate a large glider and its cargo can be constructed entirely from an unoriented synthetic plastic material. In effect the shock absorbing or energy dissipating function of the winch and its associated braking elements is performed by a molecular re-alignment occurring within the material of the shock absorber itself.

Materials which have this peculiar characteristic to a greater or lesser degree may be broadly grouped as follows: linear condensation polymers; vinyl type plastics, particularly vinylidene chloride and vinyl chloride; cellulose and cellulose esters; and rubber hydrochloride. Unprocessed nylon, a synthetic linear condensation polyamide, furnishes a good example of a material which lends itself to the dissipation of extremely high energy values. The methods of manufacturing this material in its previously known forms have been disclosed in the prior art. Patent Nos. 2,071,250; 2,071,251; 2,071,253; 2,130,523; 2,137,235 and 2,190,770 to Carothers are representative.

High molecular weight polyamides such as nylon are capable of being spun into continuous filaments. The spinning may be carried out by the several methods referred to below. That is, the polyamide may be dissolved in a suitable solvent and the solution extruded through orifices into a coagulating bath, the resulting filament being continuously collected on a suitably revolving drum or spindle; or, the extruded solution may be passed through a heated chamber where the solvent is removed by evaporation. The properties of these polyamides also make it possible to spin the molten material directly without the addition of any solvent or plasticizer. For this purpose a mass of the molten polymer may be touched with a rod. Upon drawing the rod away, a filament is formed. The filament may be caught on a moving drum or reel and in this manner a continuous filament may be drawn from the molten mass until the latter is exhausted. The cross section of the filament thus obtained can be regulated by controlling the temperature of the molten mass and the rate of reeling. The higher the temperature and the more rapid the rate of reeling, the finer will be the filament.

Continuous filaments may also be produced by extruding the molten polyamide through an orifice and continuously collecting the extruded filament on a rotating drum. The fineness of the filaments may be controlled by varying the temperature of the molten polymer, the amount of pressure applied, the size of the orifice, and the rate of reeling. The filaments are wound on spools without any further cold drawing. These undrawn fibers or filaments are then fabricated into a line or rope of desired dimensions. Such a line may be of the multifilament variety having a twisted or braided construction or the shock absorbing application may indicate the use of a single strand or monofilament line. Whether a multifilament or monofilament is used will depend to a large extent upon the length and diameter of the line required for the particular operation and the relative cost of manufacture. In fabricating or twisting of the line or rope, constant care must be exercised to prevent the fibers from being substantially elongated over and beyond the amount or range required for the initial drawing or extruding operation.

A rope or line constructed in this manner has extremely unusual physical properties, not only with respect to ordinary vegetable fiber or steel lines but also with respect to a line made from oriented or completely drawn synthetic or plastic filaments as, for example, the material disclosed in the Carothers patents and also the material disclosed in application Serial No. 481,824 in the name of Richard C. du Pont, now Patent Number 2,407,634.

Figure 8:
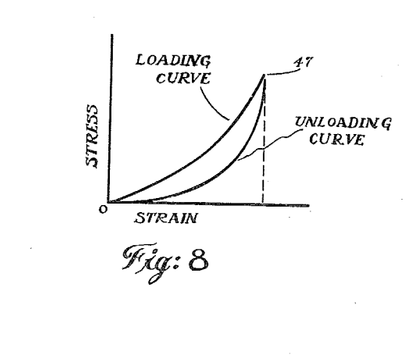
Fig. 8 is a stress-strain diagram of oriented plastic rope.

Fig. 7 shows a stress-strain curve of an unoriented synthetic plastic rope and should be compared with Fig. 8 which shows the same curve on a rope of the same material but with oriented molecular structure. Since the energy dissipated is represented in Figs. 7 and 8 by the area between the loading and unloading curves, the comparative amount of energy absorbed between the two materials is obvious from an inspection of these two diagrams, the energy absorbed by the material of Fig. 7 being many times that absorbed by the rope of Fig. 8.

Another striking difference between the curve of Fig. 7 and that of Fig. 8 is that the rope of Fig. 8 when elongated to point 47 will return in time to its original length, whereas the unoriented material shown in Fig. 7 when elongated to a similar point 48 returns only to point 49 on the unloading curve. In other words, this original elongation is never recovered and the work done on the rope over the non-recoverable portion of its elongation is absorbed in changing the molecular structure of the material. The elongation obtained with a shock absorber of this type is on the order of 100 to 700 per cent.

Figure 9:
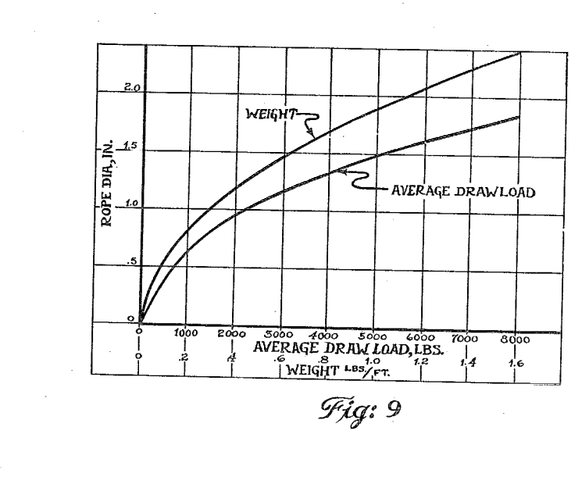
Fig. 9 is a graph showing the weight and average draw load for various rope diameters of undrawn nylon.
Figure 10:
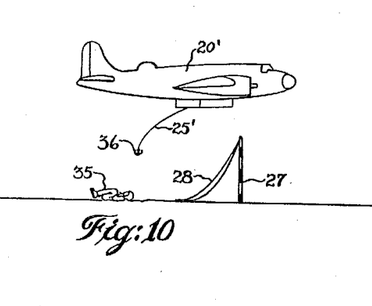
Figs. 10 to 13 show the various stages of a man pick-up made according to the invention.
Figure 11:
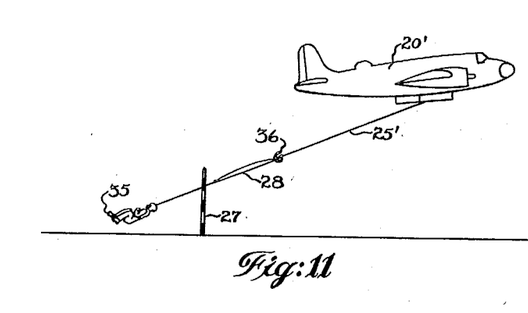
Figure 12:
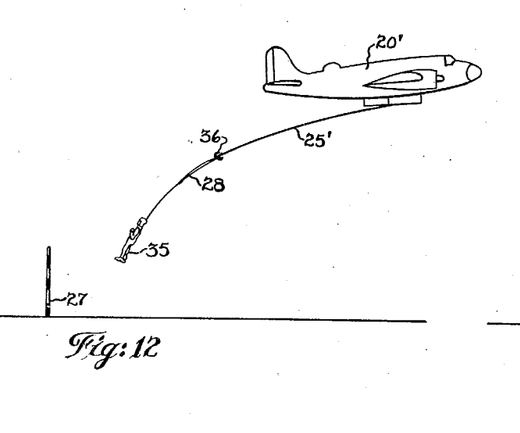
Figure 13:
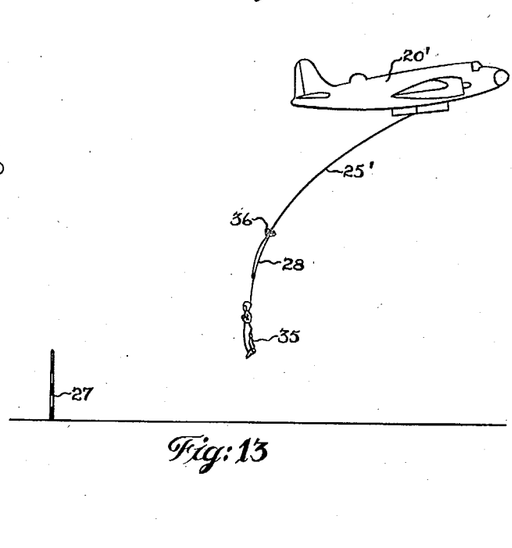

Another advantage derived in this type of shock absorber lies in the fact that tensile strength of the line does not decrease but the draw load increases as the material is elongated. This is illustrated graphically in Fig. 9 which shows the average draw load plotted against rope diameter. Fig. 9 also shows the weight of various rope diameters for undrawn nylon. By means of these curves, the rope diameter or the amount of material to be used in the rope can be ascertained when the average draw load is known.

It will be apparent that the advantages to be derived from an energy dissipating device which is capable of absorbing such relatively large amounts of energy without returning any portion of this energy which has been imparted to it is of extreme value in pick-up operations of an emergency nature. Such a line lends itself particularly to pick-up and subsequent towing operations for the reason that the initial energy is absorbed without any slingshot action or rebound and at the same time, the usefulness of the line as a tow line is thereby enhanced because its strength has been increased in the energy absorbing process.

This combination of characteristics renders it ideal for a pick-up and towing operation. However, it will also be apparent that this is not the only operation in which such a shock absorber may be utilized. Obviously, it is adaptable to any form of connection in which the velocity of one object with respect to the velocities of another object undergoes a sudden change with subsequent relatively constant tension thereafter. Examples of such applications are parachutes and arresting devices for stopping moving objects whether the moving objects be ones which are dropping through the air or to which a horizontal impetus has been imparted.

As has already been noted, the excessive elongation and gradually increasing resistance to further elongation renders such a rope ideal for the rescue of personnel by means of an aircraft as shown in Figs. 1 and 2. While this apparatus has been described as having the shock absorbing element attached to the aircraft itself, it will be obvious that the same result can be obtained if all or any of the various elements, including loop, leader, and tow line, perform all or part of the shock absorbing function. As previously noted, it is only necessary that there be sufficient energy dissipated in the system to absorb the shock of acceleration so that the rate of acceleration is held within limits which can be sustained by the object to be accelerated on the one hand and within the desired safety factors of the line and structure on the other hand.

Figs. 10 to 13 illustrate pictorially the elongation that takes place in the shock absorber 25'. They also show the steep climb into which the pilot must go in order to prevent the man from being dragged along the ground.

Figure 14:
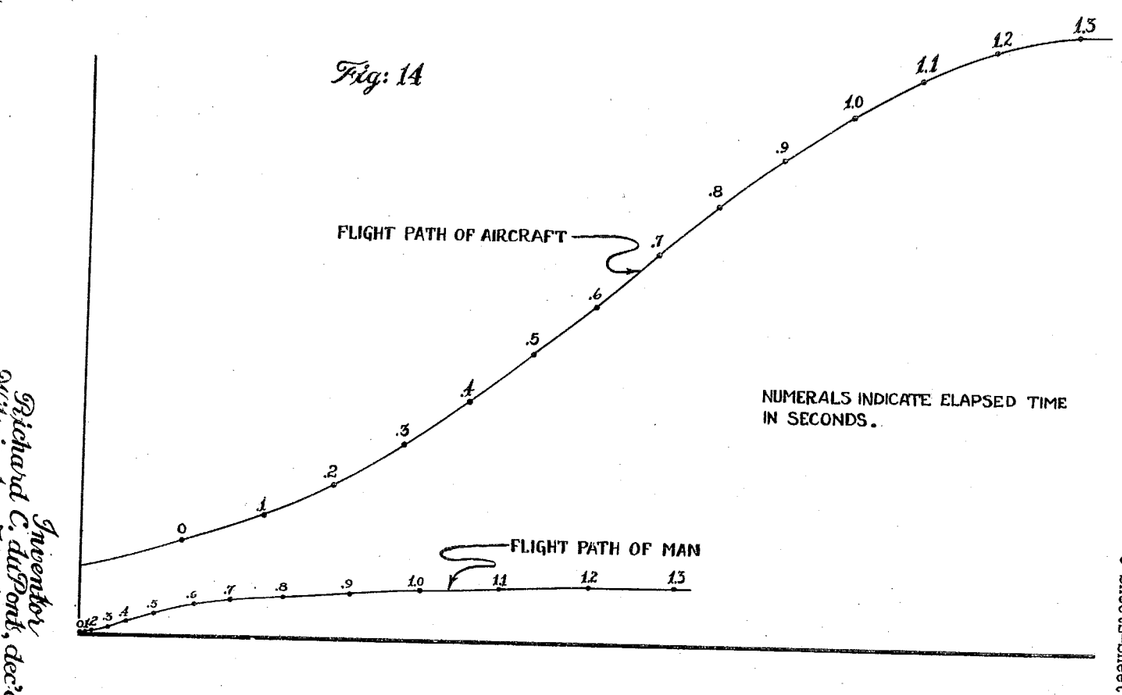
Fig. 14 shows graphically the relative flight paths of an aircraft and an object during the time interval in which the object is being accelerated to aircraft speed.

Fig. 14 shows the same sort of a pick-up graphically. For best results, the pilot in the man pick-up operation should start his climb before contact with the ground loop, and it should be continued at a very steep angle so that the elongation in the line is not great enough to cause a man to bounce or drag once he leaves the ground.

The kinetic energy required to accelerate a man having a given weight from zero velocity to the known velocity of the aircraft can be readily calculated.

$$KE = \tfrac{1}{2}mv^2$$

"$v$" corresponds to the air speed of the plane and "$m$" is the weight of the man divided by the force of gravity or $$\frac{w}{g}$$

The rate of acceleration in the case of a human being must be on the order of 4 to 8 g.'s (1 g.=32 feet per second per second). Assuming the desired acceleration then to be 4 g.'s, we would have $$f = ma = \frac{wa}{g}$$
$$= w \times 4$$

This is the draw load which will be exerted upon the line.

Having thus determined the average draw load necessary, the diameter and weight of the material to be used in the construction of the shock absorbing element can be calculated by referring to a curve such as Fig. 9. The next step in the calculations is to divide the kinetic energy, as found above, by the energy absorption per pound of the material to be used. The energy absorption which has been found in representative samples of good shock absorbing materials is on the order of 24,000 foot pounds per pound. Having determined the pounds of material needed, this figure is then divided by the weight of the rope, which was found from the curve in Fig. 9. The result of this division is the length of the desired shock absorbing element.

It will be apparent that the data used in plotting the curves of Fig. 9 and in determining the energy absorbed per pound must be taken from actual tests on samples of the particular material which it is intended to use, the curves of Fig. 9 being merely representative of one suitable material.

Improved results, particularly if extremely high rates of loading are involved, may be obtained by lubricating the shock absorber. For this purpose, the shock absorbing element may be soaked after construction in a solution of oil and suitable solvent such as gasoline.

There has thus been described a shock absorber which is easily manufactured, which cannot get out-of-order, and which has only a fraction of the weight and the cost of any shock absorber heretofore known of like capacity.

What is claimed is:

1. In an air pick-up system, an aircraft, a ground station, a loop supported by said ground station, an object to be picked up attached to said loop, a hook depending from said aircraft, and a shock absorbing element attaching said hook to said aircraft having a capacity of at least 200 per cent continuous elongation under draw load when the pick-up is made and at least 100 per cent permanent elongation, said elongation continuing under predetermined draw loads until the object picked up attains the speed of said aircraft.

2. In an air pick-up system, an aircraft, an object to be picked up and towed by said aircraft, and a tow line for connecting said object to said aircraft, said tow line having the characteristic of at least 100 per cent non-elastic continuous permanent elongation under draw loads predetermined by the number of fibers composing the rope when the pick-up is made, said elongation continuing until the object picked up attains the speed of said aircraft.

3. In an air pick-up system, a pick-up aircraft, a hook depending from said aircraft, a relatively stationary object to be picked up by said aircraft, a loop attached to said object, means for supporting said loop for engagement by the hook, and a stretchable non-elastic shock absorbing element connecting said aircraft and said object having at least 100 per cent continuous permanent elongation under draw load after pick-up whereby the entire energy of accelerating the object to the speed of the aircraft and subsequently towing it in the air is absorbed, said shock absorbing element being treated to thereby preserve and improve its shock absorbing qualties over a large variation of temperature conditions.

4. In an air pick-up system, a pick-up aircraft, a grappling device depending from said aircraft, a relatively stationary object to be picked up by said aircraft, a loop attached to said object, means for supporting said loop for engagement by the grappling device, and a shock absorbing element connecting said aircraft and said object having at least 100 per cent continuous permanent elongation under draw load after pick-up, whereby the entire energy of accelerating the object to the speed of the aircraft and subsequently towing it in the air is absorbed.

5. In an air pick-up system, a pick-up aircraft, a grappling device depending from said aircraft, a relatively stationary object to be picked up by said aircraft, a shock absorbing loop attached to said object, means for supporting said loop for engagement by the grappling device, and a shock absorbing leader connecting said loop and said object, said leader being constructed from material having at least 100 per cent continuous permanent elongation under draw load after pick-up, whereby the entire energy of accelerating the object to equal the speed of the aircraft and subsequently towing it in the air is absorbed.

6. In an air pick-up system, an aircraft, an arm depending from said aircraft, a hook positioned at the tip of said arm, a relatively stationary object to be picked up by said aircraft, a loop attached to said object, means for supporting said loop for engagement by the hook, and a shock absorbing element connecting said aircraft and said object having at least 100 per cent continuous permanent elongation under draw load after pick-up, whereby the entire energy of accelerating the object to the speed of the aircraft and subsequently towing it from the air is absorbed.

7. In an air pick-up system, an aircraft, a grapple trailing from said aircraft, a relatively stationary object to be picked up by said aircraft, a loop attached to said object, means for supporting said loop for engagement by the hook, and a shock absorbing element connecting said aircraft and said object having at least 200 per cent continuous permanent elongation under draw load after pick-up, whereby the entire energy of accelerating the object to the speed of the aircraft and subsequently towing it from the air is absorbed.

8. In an air pick-up system, an aircraft, a releasable towing connection on said aircraft, a shock absorbing tow line attached to said towing connection at one end, an arm depending from said aircraft, a hook releasably positioned at the tip of said arm and attached to the other end of said tow line, an object to be picked up, a leader attached to said object, a loop attached to said leader, and means for supporting said loop for engagement with the hook, the tow line, loop, and leader serving as a composite towing connection between said aircraft and said object, said tow line being capable of at least one hundred per cent elongation, to thereby dissipate substantially all the energy incident to the pick-up and towing operation by permanent continuous elongation after pick-up and during elongation of the energy absorbing tow line caused by inequality of speed between the aircraft and the object being picked up for towing.

9. In a shock absorbing system, an object having relative velocity with respect to another object, means for establishing connection between said objects, an element of said means being constructed of unoriented synthetic plastic fibers having at least 100 per cent continuous permanent non-elastic elongation when subjected to draw loads developed until said objects obtain equal velocities, and saturated with means adapted to improve the shock absorbing qualities thereof.

10. In a shock absorbing system, an object having relative velocity with respect to another object, means for establishing connection between said objects, and an element of said means being constructed from a synthetic condensation polyamide having 100 per cent continuous permanent non-elastic elongation when subjected to draw loads developed until said objects obtain equal velocities.

11. Apparatus for picking up a human being by an aircraft in flight comprising an aircraft, a hook suspended from said aircraft, means attached to said hook for positioning it with respect to said aircraft, and a harness to be strapped to the human being and connecting means, including the loop, between the harness and the aircraft, said connecting means having at least 200 per cent continuous permanent non-elastic elongation until the human being is accelerated to the speed of the aircraft at a rate not greater than eight times the acceleration due to the force of gravity.

12. Apparatus for picking up a human being by an aircraft in flight comprising an aircraft, a hook suspended from said aircraft, means attached to said hook for positioning it with respect to said aircraft, and a harness to be strapped to the human being and connecting means, including the loop, between the harness and the aircraft, said connecting means having at least 200% continuous non-elastic elongation whereby it has the property of absorbing the entire shock incident to accelerating the human being to the speed of the aircraft.

13. Apparatus for picking up a human being by an aircraft in flight comprising an aircraft, a hook suspended from said aircraft, means attached to said hook for positioning it with respect to said aircraft, and a harness to be strapped to the human being and connecting means, including the loop, between the harness and the aircraft, said connecting means elongating continuous permanently and non-elastically under draw load at a rate to accelerate the human being not less than three times the original length of said connecting means.

14. Apparatus for picking up a human being by an aircraft in flight comprising an aircraft, a hook suspended from said aircraft, means attached to said hook for positioning it with respect to said aircraft, a harness to be strapped to the human being and connecting means, including the loop, between the harness and the aircraft, said connecting means having at least 200 per cent continuous permanent non-elastic elongation under draw load whereby the human being is accelerated to the speed of the aircraft at a rate not greater than six times the acceleration due to the force of gravity, and whereby said human being is thereafter towed through the air by said elongated connecting means after attaining the speed of said aircraft.

15. A shock absorber comprising an elongated fabricated structure, said structure being fabricated from a plurality of unoriented synthetic plastic filaments having a non-recoverable elongation of at least 100 per cent and a gradual increasing resistance to draw load within the unoriented range of said filaments.

16. An energy absorbing structure comprising a rope, said rope being fabricated from a plurality of unoriented synthetic plastic filaments, each of said unoriented filaments of the rope structure having a continuous permanent elongation of at least 100 per cent below the orientation range of the filaments under draw load, and said draw load being less than the breaking strength of the rope.

17. A shock absorber comprising an elongated fabricated structure, said structure being fabricated from a plurality of unoriented synthetic plastic filaments having a non-recoverable elongation of at least 100 per cent and a gradual increasing resistance to draw load, and said unoriented filaments in the structure being soaked with a solution comprising a lubricant and a solvent to improve their shock absorbing qualities.

18. In the manufacture of a fabricated structure from undrawn synthetic plastic fibers for shock absorbing use, the method of fabricating a multifilament structure which comprises winding undrawn fibers of a synthetic plastic material on spools, fabricating said fibers into a multifilament structure, maintaining the tension in said fibers below the range of orientation of the fibers at all times during the fabricating operation, and then treating the finished fabricated structure with a liquid composition to improve the shock absorbing properties thereof.

19. In the manufacture of rope from undrawn synthetic plastic fibers for shock absorbing use, the method of fabricating a multifilament rope which comprises winding undrawn fibers of a synthetic plastic material on spools, fabricating said fibers into a multifilament rope, maintaining the tension in said fibers below the draw load of the fibers at all times during the fabricating operation, and then treating the finished rope with a liquid composition to improve the shock absorbing properties thereof.

20. In the manufacture of rope from unoriented synthetic plastic fibers for shock absorbing use, the method of fabricating a multifilament rope which comprises winding unoriented fibers of a synthetic condensation polyamide on spools, fabricating said fibers into a multifilament rope, maintaining the tension in said fibers below the range of orientation of the fibers at all times during the fabricating operation, and then treating the finished rope with a liquid composition to improve the shock absorbing properties thereof.

21. In the manufacture of rope from undrawn synthetic plastic fibers for shock absorbing use, which comprises winding undrawn fibers of a synthetic condensation polyamide on spools, twisting said fibers into a multifilament rope, maintaining the tension in said fibers below the draw load of the fibers at all times during the twisting operation, and then treating the finished rope with a liquid composition to improve the shock absorbing properties thereof.

WILMINGTON TRUST COMPANY,
*Executor of the Estate of Richard C. du Pont, Deceased.*
By JOSEPH RHOADS,
*Assistant Secretary.*

REFERENCES CITED

The following references are of record in the file of this patent:

UNITED STATES PATENTS

| Number | Name | Date |
|---|---|---|
| 1,602,851 | Holt | Oct. 12, 1926 |
| 1,758,880 | Adams | May 13, 1930 |
| 2,130,948 | Carothers | Sept. 20, 1938 |
| 2,151,395 | Smith | Mar. 21, 1939 |
| 2,161,766 | Rugeley et al. | June 6, 1939 |
| 2,197,896 | Miles | Apr. 23, 1940 |
| 2,252,554 | Carothers | Aug. 12, 1941 |
| 2,261,598 | Tyson | Nov. 4, 1941 |
| 2,343,892 | Dodge et al. | Mar. 14, 1944 |
| 2,367,607 | Plummer | Jan. 16, 1945 |
| 2,369,518 | Ballard | Feb. 13, 1945 |
| 2,373,414 | Plummer | Apr. 10, 1945 |